UNITED STATES PATENT OFFICE.

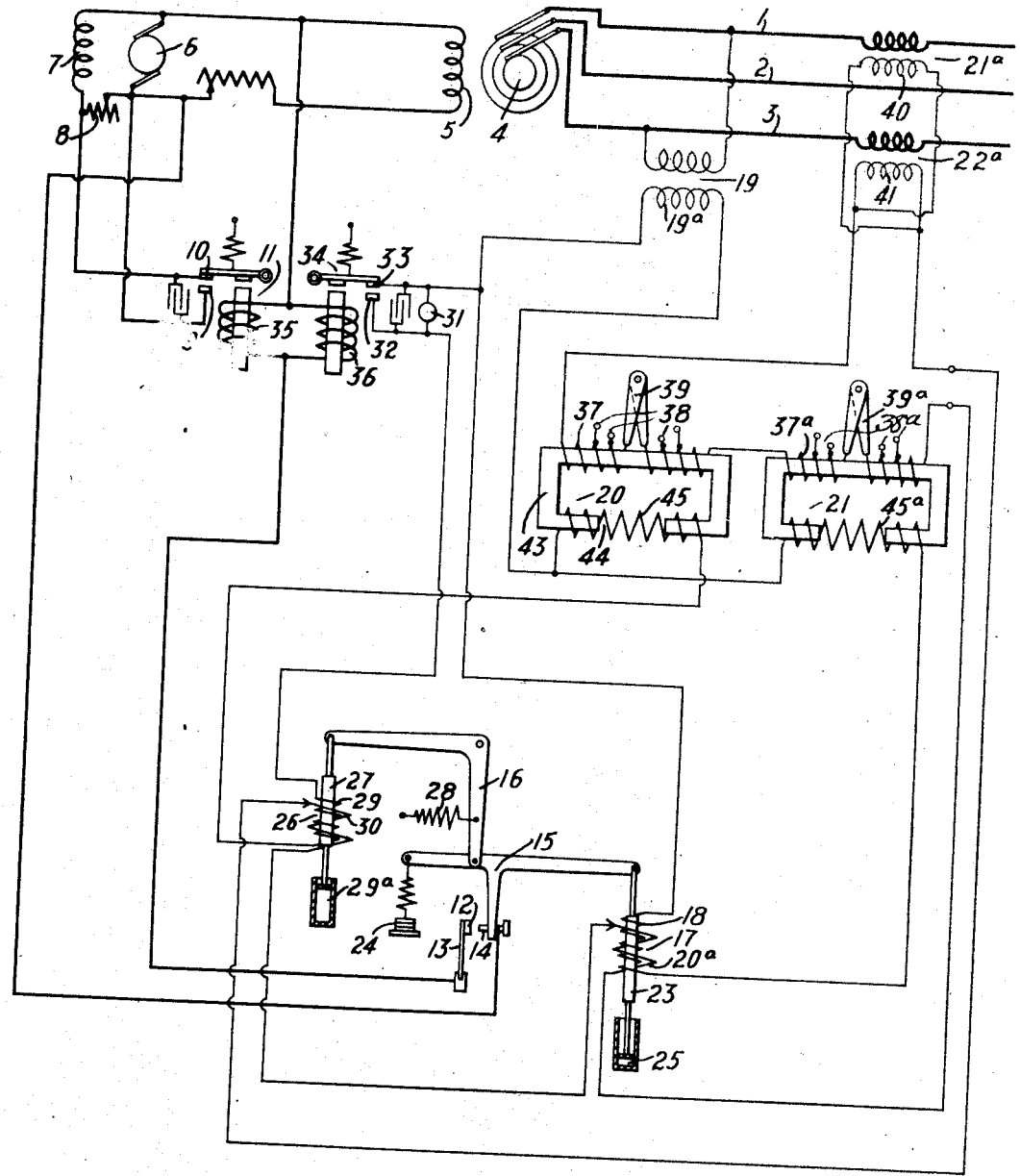

WALTER R. WOODWARD, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRICAL REGULATOR.

1,386,045.

Specification of Letters Patent. Patented Aug. 2, 1921.

Application filed August 10, 1916. Serial No. 114,158.

*To all whom it may concern:*

Be it known that I, WALTER R. WOODWARD, a citizen of the United States, and a resident of Wilkinsburg, in the county of Allegheny and State of Pennsylvania, have invented a new and useful Improvement in Electrical Regulators, of which the following is a specification.

My invention relates to electrical regulators of the vibrating-contact type that are employed for adjusting the field excitation of dynamo-electrical machines.

More particularly, my invention relates to a regulator of the above-indicated character which embodies compensating means whereby the volage or some other electrical quantity of a regulated electrical circuit may be automatically controlled or maintained constant at a predetermined point in the circuit, irrespective of the power-factor or load obtaining therein.

The usual form of regulators of the aforementioned type comprise two magnets that are excited by means of a voltage transformer connected in shunt to the circuit to be regulated. Compensators having both resistance and inductance correcting elements are connected in circuit with the secondary winding of the voltage transformer in order to vary the excitation of the magnets so that the voltage at a distant point in the circuit may be regulated or maintained constant. It will be noted that this type of regulator requires a compensator having both inductance and resistance elements in order to maintain the voltage constant at a predetermined point in the circuit, irrespective of the power factor or load obtaining therein.

An object of my present invention is to provide a regulator that requires a compensating device having an inductance element only which will control the voltage obtaining at a predetermined point in the circuit, irrespective of the electrical conditions obtaining therein. In other words, by means of my present invention, a regulator of the type mentioned above will be influenced in a manner corresponding to that which would arise if the usual voltage transformer were connected at the desired point in the circuit where it is required to keep the voltage constant. At the same time, I dispense with the usual ohmic-resistance element of the compensator that has heretofore been employed in connection with the inductance element to accomplish the results hereinbefore mentioned.

In the accompanying drawing Figure 1 is a diagrammatic view of an electrical distributing system, the voltage at a predetermined point of which is regulated by means of a regulator constructed in accordance with my invention, while Fig. 2 is a vector diagram illustrating the performance of the electrical regulator.

A system of distribution comprising three-phase conductors 1, 2 and 3 is furnished with power by a three-phase alternator 4 having a field winding 5. The field winding 5 is furnished with exciting current by an exciter 6 which, in turn, is provided with a field winding 7 that is preferably shunt excited, although it may be supplied with current from any suitable source. A resistor 8 is connected in series with the field-magnet winding 7 and is adapted to be shunted by means of coöperating stationary and movable contact members 9 and 10 of a relay 11 constituting a part of the regulator.

The regulator comprises also a stationary contact member 12 that is resiliently mounted in any suitable manner, as upon the end of a plate spring 13, and a coöperating movable contact member 14 that is mounted upon one end of a bell-crank lever 15. The lever 15 is pivotally supported, or fulcrumed upon the lower end of the vertical arm of another bell-crank lever 16. The bell-crank lever 15 is actuated by means of an electromagnet 17 having two windings, one being a voltage winding 18 that is excited by means of a voltage transformer 19 having a secondary winding 19$^a$ and an auxiliary transformer 21, and another being a current winding 20$^a$ that is excited by means of current transformers 21$^a$ and 22$^a$ having their primary windings connected in series circuit with the distributing conductors 1 and 3, respectively.

The electromagnet 17 also comprises a core member 23 that is pivotally connected to the lever 15 and is partially counter-balanced by an adjustable counterweight 24. The windings 18 and 20$^a$ of the electromagnet 17, when sufficiently energized, exert a pull upon the core 23 to raise it upwardly. The movement of the core 23 may be retarded by means of a dash-pot 25. It will be noted that the electromagnet 17 serves to vary the distance between the contact terminal 14 and the stationary contact terminal 12 in response to the selected electrical conditions obtaining in the distributing circuit, as will be hereinafter explained.

The lever 16 is actuated to move the contact terminal 14 substantially horizontally into and out of engagement with the stationary contact terminal 12 by means of an electromagnet 26 having a core 27 that is drawn downwardly in opposition to a spring 28 when its windings 29 and 30 are sufficiently energized. The movements of the core 27 and the lever 16 may be retarded by means of a dash-pot $29^a$, the retardation afforded by the latter being less than that afforded by the dash-pot 25 in order that approximate regulation of the circuit may be effected by means of the main control magnet 26 and the finer regulation by means of the magnet 17.

The winding 29 of the electromagnet 26 is connected in series circuit with the secondary winding $19^a$ of the voltage transformer 19 and with a winding of the transformer 20, as will be hereinafter explained. The winding 30 of the electromagnet 26 is connected in series-circuit relationship with the winding $20^a$ of the electromagnet 17, both being excited by means of the current transformers $21^a$ and $22^a$ in accordance with the load currents in the system. The winding 29 of the electromagnet 26 is connected to the voltage transformer secondary winding $19^a$ through a resistor 31, represented as an incandescent lamp. The resistor 31 is adapted to be shunted by relatively movable contact members 32 and 33 of a relay 34. The relays 11 and 34 are provided with parallel-connected actuating windings 35 and 36, respectively, that receive energy from the exciter 6, or any other suitable source, the circuit of which is governed by the contact terminals 12 and 14.

It will be observed that the contact terminal 14 may be actuated independently by the electromagnets 17 and 26 which also serve to vary the distance of the contact terminal member 14 from the terminal 12 in response to variations of the electrical conditions obtaining in the distributing circuit. The electromagnet 26, in addition, serves to move the contact terminal 14 into and out of engagement with the contact terminal 12 in accordance with variations in its energization, which variations are caused by the engagement and disengagement of the contact terminals 32 and 33 of the relay 34. The windings of the electromagnet 26 are so connected in circuit that an approximate regulation of the distributing system may be effected by that magnet alone.

The transformers 20 and 21 are similarly constructed and serve as inductive compensating elements so that the regulator may maintain a constant voltage at a distant point in the distributing system, irrespective of the power-factor or other electrical conditions obtaining in the system. A primary winding 37 of the transformer 20 is divided at an intermediate point, the portions thereof being severally provided with taps 38 and $38^a$ that are adapted to be severally engaged by means of pivotally-connected conducting arms 39 and $39^a$. The arms 39 and $39^a$ regulate the active turns in the primary windings of the transformers 20 and 21. The primary winding 37 of the transformer 20 is connected in series-circuit relationship with the primary winding $37^a$ of the transformer 21, both, in turn, being connected in series-circuit relationship with secondary windings 40 and 41 of the current transformers $21^a$ and $22^a$. The aforementioned windings 37, $37^a$, 40 and 41 are, in turn, connected in series-circuit relationship with the windings $20^a$ and 30 of the electromagnets 17 and 26.

It will be noted, that the current flowing in the windings $20^a$ and 30 of the electromagnets 17 and 26, respectively, will be substantially in phase with, and proportional to, the current flow in the distributing circuit. Therefore, their influence will be such as to vary the positions of their core members in accordance with the current flow in the distributing system.

Each of the transformers 20 and 21 comprises a magnetizable core member 43, one core leg of which is provided with an air gap 44. A secondary winding 45 is wound upon the core member and, as is well known, the electromotive force induced in the secondary winding 45 will be displaced substantially ninety degrees from the current flow in the primary winding 37. In a similar manner, a secondary winding $45^a$ of the transformer 21 serves as an inductive winding in which the induced electromotive force is displaced ninety degrees from the current flowing in the primary winding $37^a$.

The winding 29 of the electromagnet 26, as mentioned above, is connected in circuit with the winding $19^a$ of the voltage transformer 19, the resistor 31, and the secondary winding 45 of the transformer 20. The winding 45 serves to impart a magnetizing component to the excitation or magnetization of the electromagnet 26 that is substantially ninety degrees out of phase with the magnetizing component furnished by the aforementioned winding 30 because of the relationship existing between the primary and secondary windings of the transformers 20 and 21. In a similar manner, the winding 18 of the electromagnet 17 is connected in series circuit with the secondary winding $45^a$ of the transformer 21 and the secondary winding $19^a$ of the transformer 19. In this case, a magnetizing component is imparted by the winding 18 of the electromagnet 17 that is displaced substantially ninety degrees in phase from the component furnished by the winding 20ᵃ. The electromagnets 17 and 26 are, therefore, under the joint influence of two magnetizing forces, one being in phase with, and proportional to, the currents obtained by the vectorial addition of the currents in the two outside leads, and the other being proportional to said currents and displaced substantially ninety degrees therefrom. By reason of this composition of forces the electromagnets will automatically regulate to maintain a constant voltage at a predetermined point in the system, irrespective of the power-factors or loads obtaining.

In Fig. 2 are shown the vector relationships of the various currents and electromotive forces which obtain in the electrical circuit which it is desired to regulate. The vector $Eo$ represents the open-circuit line voltage while the vector $I$ represents a lagging current which will flow in the electrical circuit when a load is attached thereto. An ohmic drop represented by the vector $Er$ which, it will be observed, is in phase with the current vector $I$, is subtracted, in the manner indicated, from the voltage $Eo$. Furthermore, an inductive drop due to the inherent inductance of such an electrical circuit as that shown, is represented by the vector $Ei$ which is 90°, in position, from the vector representing the ohmic drop. When these two are combined with the voltage $Eo$, the line voltage or $E$ is obtained. In order, therefore, that the regulator may be actuated in accordance with the varying conditions of the electrical circuit, it is necessary to superimpose upon the magnetomotive force generated by the voltage coil, common to regulators of this type, magnetomotive forces which are proportional to, and in the proper phase relation with, the ohmic and inductive drops in the system. It will be observed that the current obtained by the vectorial addition of the currents in the coils 40 and 41 is in phase with the voltage existing across the two outside leads or, in other words, that in the primary winding of the transformer 19. Therefore, the current thus obtained is in the proper phase position to exert an influence proportional to the ohmic drop in the system, since it is obtained by an addition of the currents in the two outside leads, the same leads across which the main voltage transformer coil is connected.

Furthermore, the voltage obtained from the secondary members 45 and 45ᵃ is 90° in phase position from the current which sets up the flux inducing that voltage, or, in other words, the current heretofore referred to as being obtained from the addition of the currents in the two outside leads, 1 and 3. Therefore, the voltage existing across the coils 45 and 45ᵃ, being, as it is, 90° in phase position from the ohmic drop component, is instrumental in influencing those electromagnets with which the coils 45 and 45ᵃ are associated, in accordance with the inductive drop.

To understand the operation of the regulator, in its performance of the above-described function, assume that, for an instant, the contact terminal 14 is out of engagement with the contact terminal 12. In consequence thereof, the windings 35 and 36 of the relay magnets 11 and 34 are not energized. The shunt circuit around the resistor 8 is then interrupted and the field excitation and voltage of the exciter 6 are diminished, followed by a diminution of the field excitation and voltage of the main generator 4. The reduction of the voltage in the main generator energizes, to a less degree, the windings 18 and 29 of the electromagnets 17 and 26. At the same time the other windings 20ᵃ and 30 are energized to a less degree, since the electromotive forces severally induced in the secondary windings 45 and 45ᵃ are dependent upon the current flow in the secondary windings 40 and 41 of the current transformers 21ᵃ and 22ᵃ, as well as upon the current flow in the secondary winding 19ᵃ of the voltage transformer 19. When the electromagnet 17 is energized, the contact terminal 14 is accordingly moved toward the terminal 12. When the contact terminals 32 and 33 are not in engagement, the resistor 31 is included in circuit with the winding 29 of the electromagnet 26, with the result that the winding is less strongly energized, and the spring 28 draws the contact terminal 14 into engagement with the terminal 12. The magnet windings 35 and 36 are thereupon energized, and the relay contact members are brought into engagement. A shunt circuit to the resistor 8 is thus established, with the result that the field excitation and voltage of the exciter 6 are increased, followed by increases of field excitation and voltage of the main generator 4. Then, by reason of the greater energization of the electromagnets 17 and 26, the contact terminal 14 is moved slightly away from the terminal 12. Upon engagement of the contact terminals 32 and 33, the resistor 31 is shunted and the winding 29 of the electromagnet 26 becomes more strongly energized, with the result that the contact terminal 14 is thereby moved out of engagement with the terminal 12.

From the foregoing description, it will be observed that the windings 20ᵃ and 30 of the electromagnets 17 and 26, respectively, are energized with currents proportional to, and in phase with, the load currents. These windings perform the function of resistance elements of compensators heretofore used to compensate for the ohmic drop in the distributing circuit. The secondary windings 45 and 45ª of the transformers 20 and 21, respectively, severally excite, in combination with the transformer winding 19ª, the windings 29 and 18 of the electromagnets 26 and 17.

Referring again to Fig. 2, it is apparent that, when unity power factor obtains in the system to be regulated, the vector $Ei$, representing that component which is obtained from the windings 45 and 45ª will be displaced in phase 90° from the electromotive force induced in the winding 19ª, and, consequently, 90° from the current flowing in the primary members of the transformers 20 and 21. It should be remembered that this last-mentioned current is that one which regulates the actuation of the electromagnets in accordance with the ohmic component of the line loss. If now, the current in the circuit to be regulated is lagging, the voltage obtained from the windings 45 and 45ª will still be 90° in position from the current flowing through the primary windings associated therewith, or the two currents will still represent the ohmic and inductive components of the line losses The combined effect of the two windings will then influence the cores of the electromagnets in such manner that the field excitation of the generator 4 will be increased, and constant control thereby maintained over the voltage in the electrical circuit On the other hand, if leading currents obtain in the distributing circuit, the combination of voltages will so influence the electromagnet cores that the field excitation of the generator 4 will be decreased, and the desired control will be maintained. In other words, the small triangle representing the resistance and the ohmic drops in the system to be regulated will vary in position only and not in magnitude, and by thus varying in position, as the current in the system is leading or lagging, will exert the desired influence on the cores of the electromagnets which control the opening and closing of the contacts.

The voltage, or other electrical condition, is regulated or maintained constant at a predetermined point in the circuit by the present regulator without employing a compensator having an ohmic-resistance element. In this manner, the regulator is simplified in construction, and, at the same time, it automatically performs the functions heretofore performed by a compensator of the well-known type comprising both inductive and resistance elements.

For a more complete description of the main operating features of this regulator, independent of the transformers 20, 21, 21ª and 22ª and their attendant circuit connections comprising the windings 20ª and 30 of the electromagnets, reference may be had to United States Patent No. 1,147,576, in which a regulator is disclosed having some of the features of my present regulator.

While the regulator has been shown and described in detail, it will be understood by those skilled in the art that many modifications may be made therein without departing from the spirit or scope of the appended claims.

I claim as my invention:

1. A regulator for an electrical circuit comprising two electromagnets severally provided with energizing windings, one winding of one of the electromagnets being connected in series circuit with a corresponding winding of the other electromagnet through which a current proportional to the ohmic drop in said circuit flows and the other windings of the electromagnets being severally connected in circuit with inductance elements to displace, in phase relationship, the currents flowing therein.

2. A regulator for an electrical circuit comprising two electromagnets severally provided with energizing windings, one winding of one of the electromagnets being connected in series circuit with a corresponding winding of the other electromagnet through which a current proportional to the ohmic drop in said circuit flows and the other windings of the electromagnets being severally connected in circuit with inductance elements which are influenced by the current flowing in said first windings of the electromagnets, whereby the electromotive forces induced in said second windings are displaced in phase relationship from the current flowing in said first windings.

3. In combination with an electrical distributing system, an electrical regulator comprising coöperating contact members and an electromagnet influencing their engagement and disengagement, said electromagnet being provided with windings which are connected to said system so as to compensate for the ohmic drop therein and with other windings which are connected to said system so as to compensate for the reactive drop therein.

4. The combination with an electrical circuit comprising distributing conductors, a series transformer connected in circuit therewith, and a voltage transformer connected in shunt relationship thereto, of an electrical regulator comprising a plurality of electromagnets each having a plurality of windings and series transformers, the secondary winding of the series transformer which is connected in the regulated circuit being connected in series circuit with the primary windings of the series transformers pertaining to the regulator and with some of the windings of said electromagnets, and the secondary winding of said voltage transformer being connected to the secondary windings of the series transformers pertaining to the regulator and in series with other windings of said electromagnets.

5. The combination with an electrical regulator of the vibrating-contact type comprising a plurality of electromagnets severally having a plurality of energizing windings, of series transformers associated therewith and having primary windings which are connected in series-circuit relationship with some of the windings of said electromagnets and secondary windings which are severally connected in circuit with other windings of said electromagnets.

6. The combination with an electrical regulator of the vibrating-contact type comprising a plurality of electromagnets severally having a plurality of energizing windings, of series transformers associated therewith and having primary windings which are connected in series-circuit relationship with some of the windings of said electromagnets and secondary windings which are severally connected in circuit with other windings of said electromagnets, the core members of said series transformers being provided with air gaps whereby the electromotive forces induced in the secondary windings are displaced in phase relationship from the current flowing in the primary windings thereof.

7. The combination with an electrical regulator of the vibrating-contact type comprising a plurality of electromagnets severally having a plurality of energizing windings, of series transformers for influencing the excitation of said windings, said series transformers comprising variable primary windings that are connected in series-circuit relationship with corresponding windings of said electromagnets and secondary windings that are severally connected in circuit with other windings of said electromagnets, the primary and secondary windings of the series transformers being loosely magnetically coupled in order that the electromotive forces induced in the secondary windings thereof may be displaced in phase relationship from the primary currents.

In testimony whereof, I have hereunto subscribed my name this 27th day of July, 1916.

WALTER R. WOODWARD.